United States Patent
Yue et al.

(10) Patent No.: US 12,502,197 B2
(45) Date of Patent: Dec. 23, 2025

(54) ROTATION DEVICE, AND DRIVE SHAFT FOR ROTATION DEVICE

(71) Applicant: SHANGHAI MICROPORT RHYTHM MEDTECH CO., LTD., Shanghai (CN)

(72) Inventors: Bin Yue, Shanghai (CN); Xiaofei Ji, Shanghai (CN); Yingzhong Yao, Shanghai (CN)

(73) Assignee: SHANGHAI MICROPORT RHYTHM MEDTECH CO., LTD., Shanghai (CN)

( * ) Notice: Subject to any disclaimer, the term of this patent is extended or adjusted under 35 U.S.C. 154(b) by 428 days.

(21) Appl. No.: 17/641,239

(22) PCT Filed: Sep. 17, 2020

(86) PCT No.: PCT/CN2020/115872
§ 371 (c)(1),
(2) Date: Mar. 8, 2022

(87) PCT Pub. No.: WO2021/057588
PCT Pub. Date: Apr. 1, 2021

(65) Prior Publication Data
US 2022/0330971 A1  Oct. 20, 2022

(30) Foreign Application Priority Data
Sep. 27, 2019  (CN) .......................... 201910925120.5

(51) Int. Cl.
*A61B 17/3207* (2006.01)
*A61B 17/32* (2006.01)
*F16C 3/02* (2006.01)

(52) U.S. Cl.
CPC ...... *A61B 17/320758* (2013.01); *F16C 3/023* (2013.01); *A61B 2017/320004* (2013.01)

(58) Field of Classification Search
CPC ............ A61B 17/320758; A61B 17/32; A61B 2017/320004; F16C 3/023; F16C 3/02;
(Continued)

(56) References Cited

U.S. PATENT DOCUMENTS 6,217,595 B1 * 4/2001 Shturman ...... A61B 17/320758
242/430
2002/0007190 A1 * 1/2002 Wulfman ....... A61B 17/320725
606/171
(Continued)

FOREIGN PATENT DOCUMENTS

CN  105682602 A  6/2016
CN  109124730 A  1/2019
(Continued)

*Primary Examiner* — Katherine M Shi
*Assistant Examiner* — Mohammed S Adam
(74) *Attorney, Agent, or Firm* — MUNCY, GEISSLER, OLDS & LOWE, P.C.

(57) ABSTRACT

A drive shaft (1, 3) for use with a rotation device (10, 20) includes an outer layer (11, 31) and an inner layer (12, 32). The outer layer is a tubular structure, and the inner layer is accommodated in a space defined by the outer layer and defines a central lumen (13, 33) for receiving therein an external mechanism. The outer layer is rotatable about the central lumen, and the inner layer is rollable relative to both the outer layer and the external mechanism and thus allows rolling friction to occur between the drive shaft and the external mechanism. Such a structure of the drive shaft can reduce friction between the drive shaft and a guidewire as well as loss due to such friction, avoiding failure of the guidewire due to excessive friction between the guidewire and the drive shaft. Therefore, it is ensured that the drive shaft is suitable for use with guidewires commonly used in clinical practice, resulting in improved surgical operability and lower surgical cost. Also disclosed is a rotation device including an instrument (2, 4) and the drive shaft. The
(Continued)

instrument is disposed at one end of the drive shaft and is coupled to the outer layer of the drive shaft so as to be able to be driven by the outer layer to rotate.

15 Claims, 4 Drawing Sheets

(58) Field of Classification Search
CPC .... F16C 1/06; F16C 1/267; F16C 1/28; F16C 2316/10; F16C 33/30; A61F 2/24
See application file for complete search history.

(56) References Cited

U.S. PATENT DOCUMENTS

| | | | |
|---|---|---|---|
| 2003/0219184 A1* | 11/2003 | Rio | A61B 17/1624 |
| | | | 384/523 |
| 2009/0287234 A1 | 11/2009 | Suzuki | |
| 2010/0204560 A1* | 8/2010 | Salahieh | A61B 5/01 |
| | | | 606/41 |
| 2010/0228152 A1 | 9/2010 | Fisher et al. | |
| 2015/0272735 A1 | 10/2015 | Kaufmann | |
| 2016/0157886 A1 | 6/2016 | WasDyke et al. | |
| 2017/0348019 A1 | 12/2017 | Nakano et al. | |
| 2018/0263637 A1* | 9/2018 | Bono | A61B 17/1622 |

FOREIGN PATENT DOCUMENTS

| | | |
|---|---|---|
| CN | 109715092 A | 5/2019 |
| CN | 110985521 A | 4/2020 |
| CN | 211009538 U | 7/2020 |

\* cited by examiner

ROTATION DEVICE, AND DRIVE SHAFT FOR ROTATION DEVICE

TECHNICAL FIELD

The present invention relates to the field of medical devices, and more particularly to a rotation device and a drive shaft for use with a rotation device.

BACKGROUND

With the continuous development of percutaneous coronary intervention (PCI), this therapy is indicated for increasingly complex lesions. Calcified coronary lesions, in particular severe and complex ones with tortuosity, calcified nodules and infiltration, have been challenging and risky for interventional treatment. Correct identification and assessment of calcified lesions and choice of suitable interventional treatment techniques are critical to more likely success, reduced complications and improved short and long term patient prognosis.

Rotational atherectomy (RA) has become a procedure indispensable for successful PCI. A RA device ablates a calcified or fibrous arteriosclerotic plaque present in a blood vessel by high-speed spinning and cutting and thus creates an access passage with a smooth lumen, which facilitates the subsequent crossing of an implanted stent. A common RA device essentially consist of a flexible drive shaft and a burr which is disposed at a distal end of the flexible drive shaft and encrusted with an abrasive material such as diamond particles. The flexible drive shaft is used to drive high-speed spinning of the burr (in the range of approximately 150,000-190,000 rpm) and advance it so that the burr comes into contact with and ablate a lesional plaque. As a guidewire is typically inserted in an inner lumen of the flexible drive shaft, friction between the high-speed rotating flexible drive shaft and the guidewire tends to cause wear and tear of the guidewire, creating a risk of, for example, unwanted removal of a coating on the surface of the guidewire, thermal melting of the guidewire, or even uncoiling of a coiled section at a front end of the guidewire.

Therefore, existing flexible drive shafts are unsuitable for use with guidewires commonly used in clinical practice (e.g., 0.014-inch wires) due to the risk of undesirable removal of a PTFE coating on the guidewire surface, uncoiling of a coiled section, or even worn breakage. For these reasons, in the current practice, special guidewires without a surface coating or a coiled section at the front end are usually used. However, since such special guidewires are poor in compliance and pushing ability, their use is not only conducive to surgical procedures, but also leads to higher surgical cost.

SUMMARY OF THE INVENTION

In order to overcome the above-described problems, it is an object of the present invention to provide a rotation device and a drive shaft for use with a rotation device. The drive shaft employs a modified structural design, which allows for reduced friction of the drive shaft with a guidewire and less loss due to such friction, thus avoiding failure of the guidewire due to melting, wear or uncoiling caused by excessive friction between the guidewire and the drive shaft. Thus, it is ensured that the drive shaft is suitable for use with guidewires commonly used in clinical practice, resulting in improved surgical operability and lower surgical cost.

To this end, the present invention provides a drive shaft for use with a rotation device. The drive shaft includes an outer layer and an inner layer. The outer layer is a tubular structure defining an accommodating space, and the inner layer is arranged in the accommodating space and defines a central lumen for receiving therein an external mechanism. The outer layer is rotatable about the central lumen, and the inner layer is rollable relative to both the outer layer and the external mechanism and thus allows rolling friction to occur between the drive shaft and the external mechanism.

Optionally, the inner layer may include a number of rollers disposed on an inner surface of the outer layer.

Optionally, the rollers may be arranged around an axis line of the outer layer to form a spiral.

Optionally, the rollers may be arranged around the axis line of the outer layer to form one continuous spiral or multiple spirals that are spaced apart.

Optionally, the rollers may be arranged around the axis line of the outer layer to form multiple rings, which are axially spaced apart, or abut one another.

Optionally, the rollers may be ball rollers, spherical rollers, cylindrical rollers, needle rollers or tapered rollers.

Optionally, a rollway may be arranged on an internal side of the outer layer, and the rollers may be moveably disposed in the rollway in such a manner that each of the rollers partially protrudes out of the rollway and comes into contact with the external mechanism.

Optionally, the rollers may be made of a polymer.

Optionally, slits may be provided in the outer layer to allow a fluid to flow therethrough to the inner surface and/or an outer surface of the drive shaft.

Optionally, the outer layer may be connected to the inner layer magnetically, or by clamping or embedding.

The above object is also attained by a rotation device provided in the present invention, which includes an instrument and the drive shaft as defined in any of the preceding paragraphs. The instrument is disposed at one end of the drive shaft and coupled to the outer layer of the drive shaft, and the instrument is configured to be driven by the outer layer to rotate.

Optionally, the instrument and the drive shaft may be formed as separate parts or as an integral part. Alternatively, the instrument and the outer layer of the drive shaft may be formed as an integral part.

Optionally, the instrument may be an abrasive element.

The rotation device and the drive shaft of the present invention have at least one of the following advantages:

First, through incorporating the rollable inner layer in the drive shaft, rolling friction instead of sliding friction can occur between the drive shaft and a guidewire. This results in effectively reduced friction between the drive shaft and the guidewire and less loss due to such friction, thus avoiding wear and tear of a surface coating, thermal melting and uncoiling of a coiled section, of the guidewire, during high-speed rotation of the drive shaft. Additionally, the risk of failure of the guidewire is reduced, and the drive shaft is made suitable for use with guidewires commonly used in clinical practice, resulting in improved surgical operability and lower surgical cost.

Second, the inner layer may consist of commonly-used rollers such as ball rollers, spherical rollers, cylindrical rollers, needle rollers or tapered rollers. This design allows structural simplicity and low manufacturing cost.

Third, the rollers in the inner layer may be made of a polymer with a low surface friction coefficient, which can additionally reduce friction and fictional loss.

Fourth, slits may be provided in the outer layer to allow a fluid such as a coolant or lubricant to flow therethrough to the inner surface and/or the outer surface of the drive shaft, resulting in further reductions in friction and heat generated by friction.

BRIEF DESCRIPTION OF THE DRAWINGS

Those of ordinary skill in the art would appreciate that the following drawings are presented merely to enable a better understanding of the present invention rather than to limit the scope thereof in any sense. In the drawings.

Figure 1:
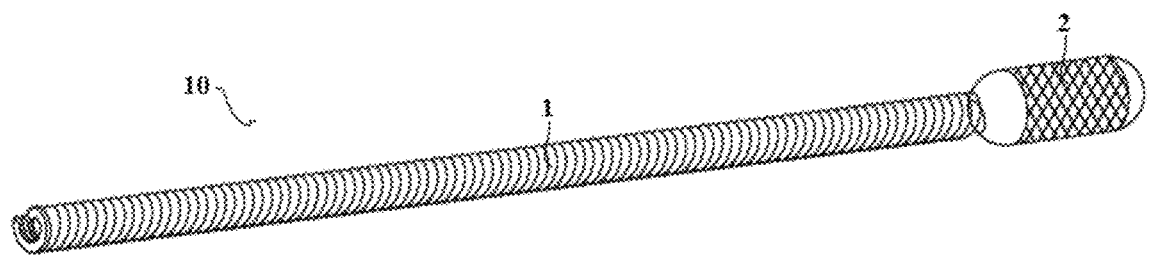
FIG. 1 is a structural schematic of a rotation device according to a first embodiment of the present invention.

In these figures,
10, 20—rotation device
1, 3—drive shaft;
11, 31—outer layer;
12, 32—inner layer;
13, 33—central lumen;
121, 321—roller;
34—rollway;
2, 4—instrument;
122—holder.

Like reference numerals across the several views refer to like parts.

DETAILED DESCRIPTION

Objectives, advantages and features of the present invention will become more apparent from the following more detailed description thereof made in conjunction with the accompanying drawings. Note that the figures are provided in a very simplified form not necessarily drawn to exact scale for the only purpose of helping to explain the disclosed embodiments in a more convenient and clearer way.

As used herein, the singular forms "a", "an" and "the" include plural referents, unless the context clearly dictates otherwise. As used herein, the term "or" is generally employed in the sense of "and/or", unless the context clearly dictates otherwise.

In the following description, the terms "distal", "proximal", "axial" and "circumferential" may be used for the sake of ease of description. When used to describe a rotation device, the term "distal" refers to an end thereof farther away from an operator who is operating the device, and the term "proximal" refers to an end closer to the operator. Moreover, the term "axial" refers to a direction along a longitudinal axis of the rotation device, and the term "circumferential" refers to a direction about the longitudinal axis of the rotation device. Further, when used to describe a drive shaft, the term "internal" refers to a side closer to a longitudinal axis of the drive shaft, and the term "external" refers to a side opposite to the "internal" side. As used herein, the term "multiple" is generally employed in the sense of "two or more" and "several" of "a non-specific number of", unless the context clearly dictates otherwise.

The following description sets forth numerous specific details in order to provide a more thorough understanding of the present invention. However, it will be apparent to those skilled in the art that the present invention can be practiced without one or more of these specific details. In other instances, well-known technical features have not been described in order to avoid unnecessary obscuring of the present invention.

Embodiment 1

Figure 2:
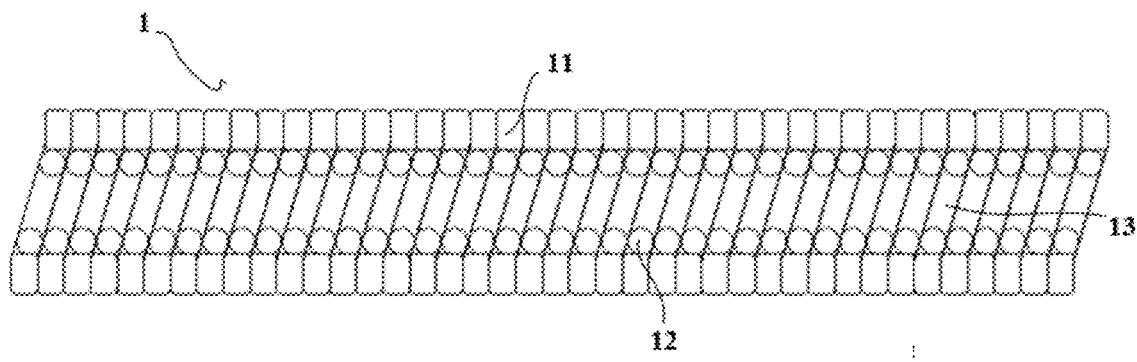
FIG. 2 is an axial sectional view of a drive shaft according to the first embodiment of the present invention.
Figure 3:
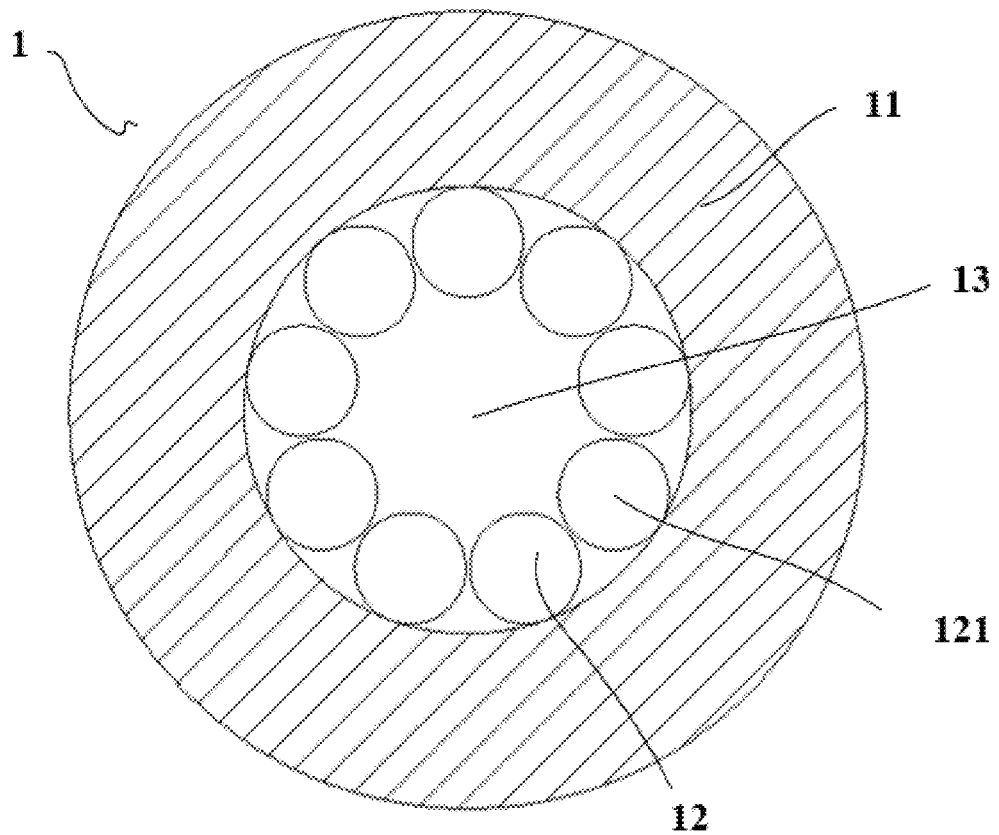
FIG. 3 is a cross-sectional of the drive shaft according to the first embodiment of the present invention.

FIG. 1 is a structural schematic of a rotation device according to a first embodiment (Embodiment 1) of the present invention. FIG. 2 is an axial cross-sectional view of a drive shaft in the rotation device according to the first embodiment of the present invention. FIG. 3 is a cross-sectional view of the drive shaft in the rotation device according to the first embodiment of the present invention.

As shown in FIG. 1, the rotation device 10 according to this embodiment includes the drive shaft 1 and an instrument 2. The drive shaft 1 is coupled at a distal end thereof to the instrument 2 in order to drive rotation of the instrument 2. Typically, the drive shaft 1 is configured to transfer a torque and drive rotation of the instrument coupled thereto, which is for example an abrasive element. The rotation device 10 of this embodiment may be used to perform an intravascular surgical procedure, for example, for ablating tissue from the body through an intracorporeal conduit. For example, it may be used to ablate a calcified or fibrous arteriosclerotic plaque that occludes a blood vessel (e.g., coronary, peripheral or the like), thereby creating a smooth access lumen in the blood vessel. To this end, the instrument 2 may be able to spin at a high speed, for example, in the range of 150000-190000 rpm, so that the rotation device 10 is used for high-speed rotary grinding at the vascular lesions, so as to realize the removal of the target tissue.

The drive shaft 1 and the instrument 2 may be arranged coaxially or eccentrically. The instrument 2 may be entirely disposed on the drive shaft 1. For example, the instrument 2 may define a central bore and may be disposed over the drive shaft 1 over an entire length of the central bore. Alternatively, the instrument 2 may be partially disposed on the drive shaft 1. For example, it may be disposed over the drive shaft 1 over only part of the length of the central bore. Further, the drive shaft 1 may extrude at the distal end out of the instrument 2. Therefore, the present invention is not limited to any particular approach for coupling the instrument 2 to the drive shaft 1.

As shown in FIG. 2, the drive shaft 1 includes an outer layer 11 and an inner layer 12. The outer layer 11 is a tubular structure defining an accommodating space and is preferably flexible. The inner layer 12 is accommodated in the space defined by the outer layer 11, and the inner layer 12 defines a central lumen 13 for receiving therein a guidewire (which is an external mechanism). The central lumen 13 allows the drive shaft 1 to be advanced, retracted and rotated relative to the guidewire. It should also be understood that when the outer layer 11 is a flexible tubular structure, it can bend and deform as desired when transferring a torque. That is, the outer layer 11 has not only pushing ability but also good compliance. Additionally, the instrument 2 may be coupled to a distal end of the outer layer 11 so as to be able to be driven by the outer layer 11 to rotate. In this embodiment, the instrument 2 and the drive shaft 1 may be separately formed and then assembled together. In alternative embodiments, the instrument 2 and the drive shaft 1 may be integrally formed. In particular, the instrument 2 and the outer layer 11 may be integrally formed so that, for example, the outer layer 11 has a diametrically enlarged portion and the surface of at least one section of this portion is encrusted with an abrasive material. In this case, the abrasive section of the outer layer may form the instrument 2. When the outer layer is rotating at a high speed, the abrasive section is able to remove stenotic tissue from a blood vessel.

Specifically, the inner layer 12 is rollably arranged in the outer layer 11. More specifically, while the outer layer 11 is rotating at a high speed about the central lumen 13, the inner layer 12 rolls relative to both the outer layer 11 and the guidewire in the central lumen 13 so that only rolling friction may occur between the inner layer 12 and the guidewire. That is, with this design, rolling friction instead of sliding friction is allowed between the drive shaft 1 and the external mechanism. This enables reduced friction between the drive shaft and the guidewire during high-speed rotation of the drive shaft, thus avoiding possible failure of the guidewire, making the rotation device suitable for use with a commonly-used guidewire and resulting in improved surgical operability and lower surgical cost.

Further, the present invention is not limited to any particular approach for forming the outer layer 11. For example, it may be braided from filaments, or formed by spiral cutting of a tube or by spiral coiling of wires. Alternatively, it may be implemented as a tubular elastic member such as a corrugated tube, or as an extruded polymer tube. Preferably, the outer layer 11 is a spring coil formed of one or more wires, which is capable of providing a large torque and is desirably compliant. More preferably, slits may be provided in the outer layer 11 to allow fluid(s) (e.g., saline and/or water or another fluid) to pass therethrough to an inner surface and/or an outer surface of the outer layer 11 to provide cooling and/or lubrication at interfaces of the outer layer 11, the inner layer 12 and the guidewire to further reduce wear and enhance heat dissipation. For example, slits may be provided between at least some turns of the spring coil in order to facilitate flowing of the fluids. Specifically, individual turns of the spring coil may be spaced apart. That is, there may be slits between adjacent turns. Alternatively, some turns of the spring coil may be closely arranged to each other without any slit left therebetween. The outer layer 11 may be formed of a metallic material, or a combination of multiple metallic materials, or a combination of a metallic material and an organic polymeric material. For example, the outer layer 11 may be formed of one of stainless steel, nickel, titanium and tungsten, or a combination thereof. Preferably, the outer layer 11 is made of stainless steel or a nickel-titanium alloy, which enables the outer layer 11 have increased flexibility and superelasticity and thus ensures good compliance of the drive shaft 1. Further, the present invention is not limited to any particular shape of the spirally coiled wires, and the shape may be elongate (e.g., rectangular), circular or elliptic.

As shown in FIG. 3, the inner layer 12 may include several rollers 121, which are disposed on the inner surface of the outer layer 11. More specifically, the several rollers 121 are disposed around an axis line of the outer layer 11 and define the central lumen 13. The present invention is not limited to any particular shape of the rollers 121. Examples of the rollers 121 may include ball rollers, spherical rollers, cylindrical rollers, needle rollers and tapered rollers. The inner layer 12 may include rollers either of different shapes or of the same shape. In this embodiment, the rollers 121 are ball rollers. The rollers 121 may be formed of either a metallic material or a non-metallic material. Examples of the metallic material may include, but are not limited to, carbon steel, bearing steel and stainless steel. Examples of the non-metallic material may include, but are not limited to, plastics and ceramics. Preferably, the rollers 121 are made of a material with a relatively low friction coefficient, such as a polymer, which can additionally reduce friction. The polymer may be one of polytetrafluoroethylene (PTFE), polyimide, nylon and polyether ether ketone (PEEK), or a combination thereof.

The present invention is not limited to any particular arrangement of the rollers 121. In some embodiments, the rollers 121 may be spirally arranged around the axis line of the outer layer 11. For example, the rollers 121 may be arranged to form a continuous spiral extending around the axis line of the outer layer 11 from a proximal to distal end thereof. As another example, the rollers 121 may be arranged around the axis line of the outer layer 11 to form multiple spirals that are spaced apart from one another. In this embodiment, as shown in FIG. 2, the ball rollers are arranged around the axis line of the outer layer 11 to form a continuous spiral. In an alternative embodiment, the rollers 121 may be arranged around the axis line of the outer layer 11 to form at least one ring, which may be either circular or elliptic. Optionally, the rollers 121 may be arranged around the axis line of the outer layer 11 to form multiple rings, which may be axially spaced apart or not.

The present invention is not limited to any particular approach for attaching the outer layer 11 to the inner layer 12. For example, the attachment of the two may be accomplished magnetically or by clamping or embedding. In the case of magnetic attachment, the rollers 121 may have magnetic properties and can be attracted to the outer layer 11. Alternatively, the outer layer 11 may have magnetic properties. In the case of the attachment being accomplished by clamping, a holder partially wrapping the rollers 12 may be provided either on the outer layer 11 or on the inner layer 12. The holder may be moveable with the rollers 121 and may be configured to separate the rollers apart, guide the rollers and hold the rollers within the outer layer.

Figure 9:
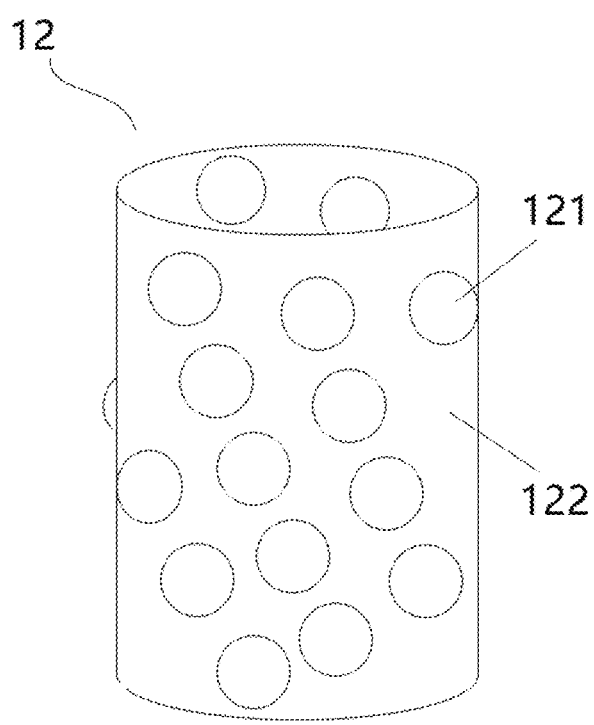
FIG. 9 is a structural schematic of a holder according to an embodiment of the present invention.

FIG. 9 shows an implementation of the holder 122 that is provided on the inner layer 12. As shown in FIG. 9, the holder 122 on the inner layer 12 is a thin-walled cylinder provided with several holes or openings having a diameter greater than an outer diameter of the rollers 121, and the rollers 121 are disposed in the holes or openings so as to be able to 360° roll therein. In the case of the attachment being accomplished by embedding, a rollway may be provided on the inner surface of the outer layer 11, and a number of rollers 121 may be moveably disposed therein in such a manner that each of the rollers 121 partially protrudes out of the rollway and comes into contact with a guidewire. The rollway may have a shape depending on the arrangement of the roller. For example, the rollway may be a continuous spiral, spaced multiple spirals, or at least one circular or elliptic rings. In this embodiment, the rollers 121 are magnetically attached to the outer layer 11, as shown in FIG. 3.

An inner diameter of the drive shaft 1 is configured to be matched with the size of a commonly-used guidewire. Optionally, the inner diameter of the drive shaft 1 may range from 0.008 inches to 0.04 inches so as to be suitable for use with commonly-used 0.014-inch guidewires. An outer diameter of the drive shaft 1 is configured to be matched with the size of a commonly-used delivery sheath. Optionally, the outer diameter of the drive shaft 1 may range from 0.02 inches to 0.08 inches.

Embodiment 2

A rotation device according to a second embodiment is substantially similar to that of Embodiment 1 as detailed below. Features also included in Embodiment 1 are not described in detail again.

Figure 4:
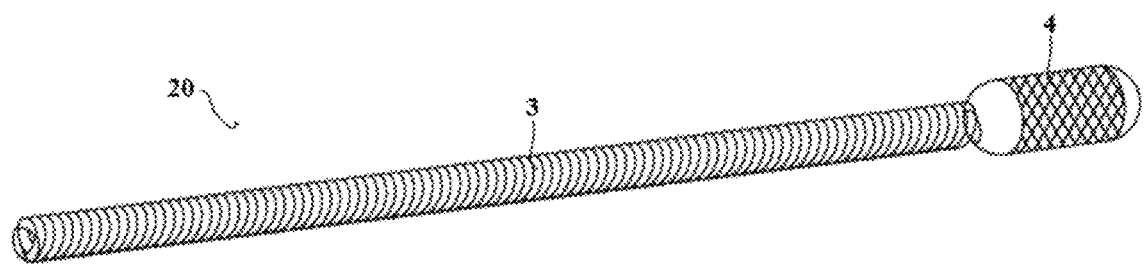
FIG. 4 is a structural schematic of a rotation device according to a second embodiment of the present invention.
Figure 5:
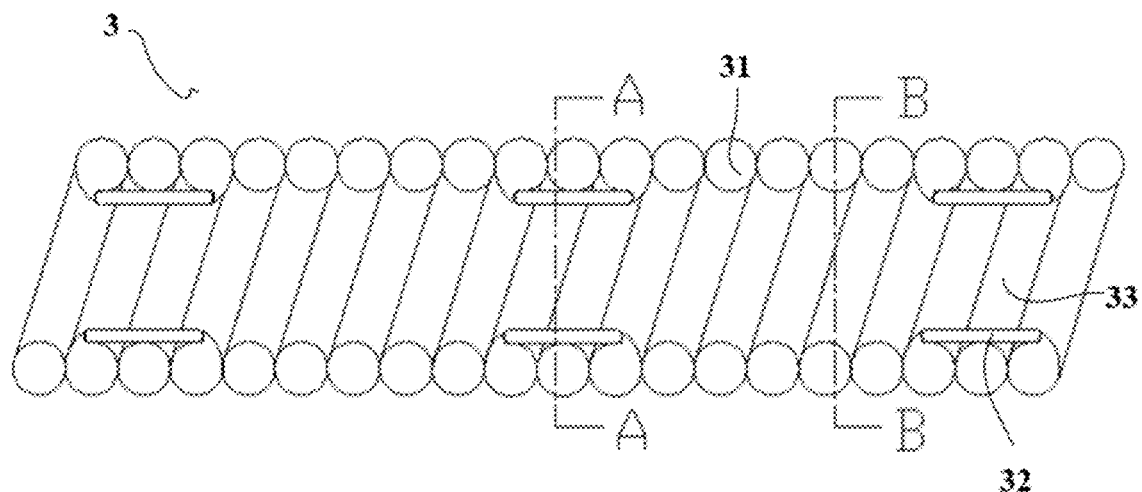
FIG. 5 is an axial sectional view of a drive shaft according to the second embodiment of the present invention.
Figure 6:
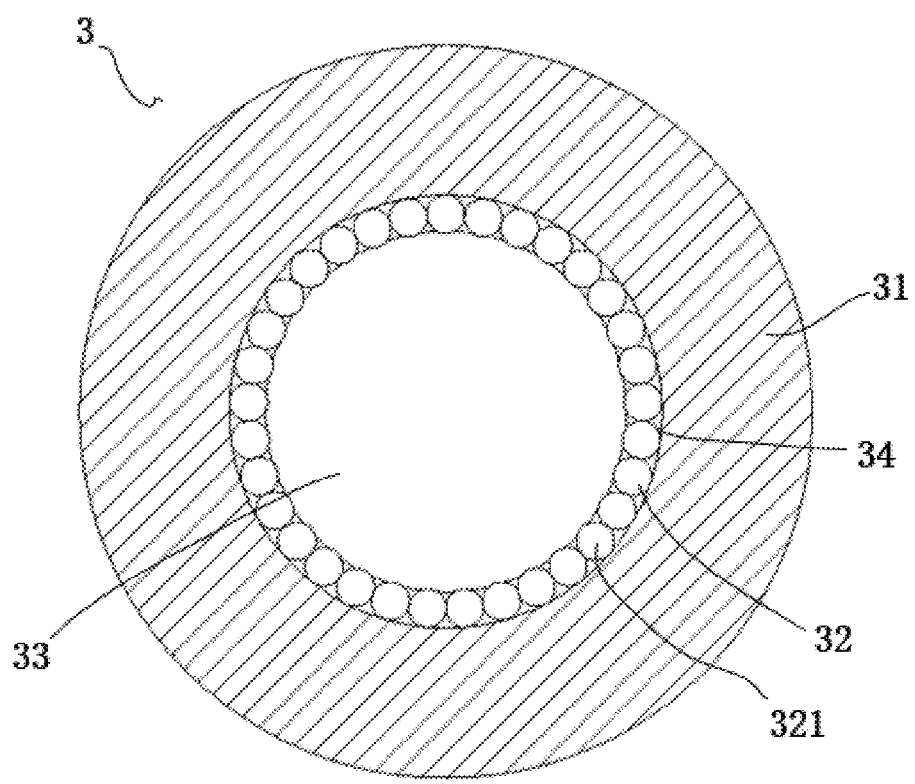
FIG. 6 is a cross-sectional view of the drive shaft of FIG. 5 taken along line A-A.
Figure 7:
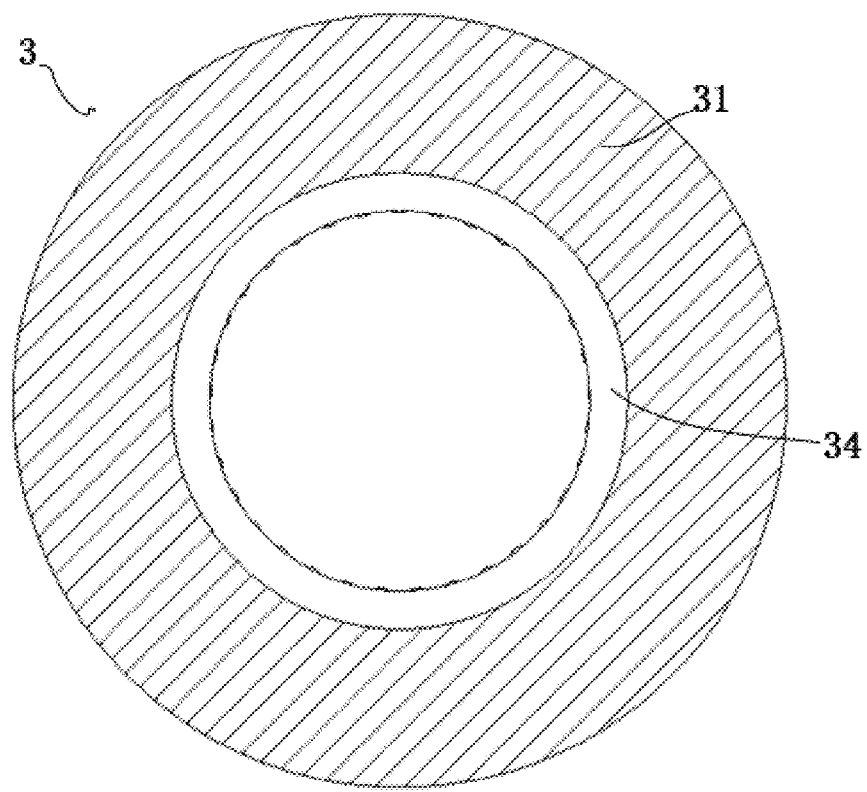
FIG. 7 is a cross-sectional view of the drive shaft of FIG. 5 taken along line B-B.
Figure 8:
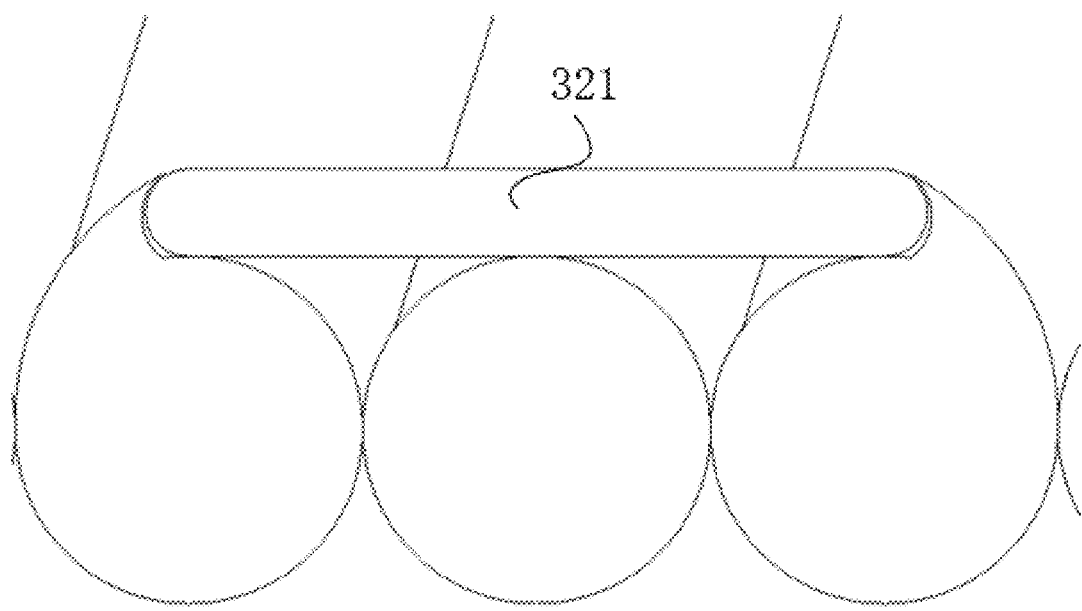
FIG. 8 is an enlarged partial view of the drive shaft of FIG. 5.

FIG. 4 is a structural schematic of the rotation device according to the second embodiment of the present invention. FIG. 5 is an axial sectional view of a drive shaft in the rotation device according to the second embodiment of the present invention. FIG. 6 is a cross-sectional view of the drive shaft of FIG. 5 taken along line A-A. FIG. 7 is a cross-sectional view of the drive shaft of FIG. 5 taken along line B-B. FIG. 8 is an enlarged partial view of the drive shaft of FIG. 5.

As shown in FIGS. 4 and 5, the rotation device 20 according to the second embodiment includes the drive shaft 3 and an instrument 4. The drive shaft 3 includes an outer layer 31 and an inner layer 32. The outer layer 31 is a tubular structure and is preferably flexible. The inner layer 32 is accommodated in a space defined by the outer layer 31 and defines a central lumen 33 for receiving therein a guidewire.

As shown in FIGS. 5 to 8, the internal side of the outer layer 31 is provided with rollway(s) 34. Further, multiple rollways 34, which are axially spaced apart from one another, are arranged on an internal side of the outer layer 31, and multiple rollers 321 are evenly arranged in each of the rollways 34 around the central lumen 33. As shown in FIG. 7, each rollway 34 is projected as a circular ring on a plane perpendicular to the axial direction.

In this embodiment, the rollers 321 are cylindrical rollers, which are partially exposed out of the rollways 34 and come into contact with the guidewire. In particular, the rollers 321 may be formed of PTFE.

As with the above embodiment, the instrument is coupled to a distal end of the drive shaft and may be implemented as an abrasive element, for example, as shown in FIG. 1 or 4. In exemplary embodiments, the instrument may be a cutter or a rotational atherectomy instrument such as an ablation burr. The instrument may include sensor(s) or the like capable of collecting data about an intracorporeal lumen and/or a site of interest therein (e.g., a lesion), such as its/their position(s), distance(s), temperature(s), contact force(s) or the like.

While a few preferred embodiments of the present invention have been described above, the scope of the invention is in no way limited to these disclosed embodiments. Any and all changes made to the structures provided in the above embodiments are intended to fall within the scope of the present invention. For example, polymer coatings, preferably, PTFE coatings with a low friction coefficient, may be applied to the outer and inner layers in order to further reduce friction. Those skilled in the art can devise other embodiments on the basis of the description of the foregoing embodiments.

In summary, according to embodiments of the present invention, through incorporating the rollable inner layer in the drive shaft, rolling friction instead of sliding friction can occur between the drive shaft and a guidewire. This results in effectively reduced friction between the drive shaft and the guidewire and less loss due to such friction, thus avoiding wear and tear of a surface coating, thermal melting and uncoiling of a coiled section, of the guidewire, during high-speed rotation of the drive shaft. Additionally, the risk of failure of the guidewire is reduced, and the drive shaft is made suitable for use with guidewires commonly used in clinical practice, resulting in improved surgical operability and lower surgical cost.

The description presented above is merely that of a few preferred embodiments of the present invention and is not intended to limit the scope thereof in any sense. Any and all changes and modifications made by those of ordinary skill in the art based on the above teachings fall within the scope as defined in the appended claims.

What is claimed is:

1. A drive shaft for use with a rotation device, the drive shaft comprising an outer layer and an inner layer, the outer layer being a tubular structure defining an accommodating space, the inner layer arranged in the accommodating space and defining a central lumen for receiving therein an external mechanism, wherein the outer layer is rotatable about the central lumen, and the inner layer is rollable relative to both the outer layer and the external mechanism and thus rolling friction is created between the inner layer and the external mechanism through the inner layer, wherein the outer layer is a spring coil formed of one or more wires, slits are provided between at least two turns of the spring coil to allow a fluid to flow therethrough to an inner surface and/or an outer surface of the outer layer, wherein the inner layer includes a plurality of rollers disposed on the inner surface of the outer layer, wherein the outer layer is connected to the inner layer magnetically, the plurality of rollers have magnetic properties and are attracted to the outer layer, or wherein the outer layer has magnetic properties, and wherein a plurality of rollways are arranged on an internal side of the outer layer, and the plurality of rollways are axially spaced apart from one another, and the plurality of rollers are evenly arranged in each of the rollways around the central lumen.

2. The drive shaft for use with the rotation device of claim 1, wherein the rollers are arranged around an axis line of the outer layer to form a spiral.

3. The drive shaft for use with the rotation device of claim 2, wherein the rollers are arranged around the axis line of the outer layer to form one continuous spiral.

4. The drive shaft for use with the rotation device of claim 2, wherein the rollers are arranged around the axis line of the outer layer to form a plurality of spaced spirals.

5. The drive shaft for use with the rotation device of claim 1, wherein the rollers are arranged around an axis line of the outer layer to form a plurality of rings, which are axially spaced apart, or abut one another.

6. The drive shaft for use with the rotation device of claim 1, wherein the rollers are ball rollers, spherical rollers, cylindrical rollers, needle rollers or tapered rollers.

7. The drive shaft for use with the rotation device of claim 1, wherein the rollers are made of a polymer.

8. The drive shaft for use with the rotation device of claim 1, wherein the outer layer is connected to the inner layer by clamping.

9. The drive shaft for use with the rotation device of claim 8, wherein a holder partially wrapping the rollers is provided either on the outer layer or on the inner layer, the holder configured to be moveable with the rollers and to separate the rollers apart, guide the rollers and hold the rollers within the outer layer.

10. The drive shaft for use with the rotation device of claim 1, wherein the holder is provided on the inner layer, which is a thin-walled cylinder provided with several holes or openings having a diameter greater than an outer diameter of the rollers, and the rollers are disposed in the holes or openings so as to be able to 360° roll therein.

11. The drive shaft for use with the rotation device of claim 1, wherein the outer layer is connected to the inner layer by embedding.

12. The drive shaft for use with the rotation device of claim 1, wherein each of the rollways is projected as a circular ring on a plane perpendicular to an axial direction.

13. A rotation device comprising an instrument and the drive shaft of claim 1, the instrument disposed at one end of the drive shaft and coupled to the outer layer of the drive shaft, the instrument being configured to be driven by the outer layer to rotate.

14. The rotation device of claim 13, wherein the instrument and the drive shaft are formed as separate parts, or wherein the instrument and the outer layer of the drive shaft are formed as an integral part.

15. The rotation device of claim 13, wherein the instrument is an abrasive element.

* * * * *